United States Patent
Kuroda et al.

(10) Patent No.: US 12,191,480 B2
(45) Date of Patent: Jan. 7, 2025

(54) POSITIVE ELECTRODE ACTIVE MATERIAL FOR SECONDARY BATTERY, AND SECONDARY BATTERY

(71) Applicant: Panasonic Intellectual Property Management Co., Ltd., Osaka (JP)

(72) Inventors: Kosuke Kuroda, Osaka (JP); Hiroshi Kawada, Hyogo (JP); Atsushi Fukui, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 578 days.

(21) Appl. No.: 17/604,144

(22) PCT Filed: Apr. 24, 2020

(86) PCT No.: PCT/JP2020/017613
§ 371 (c)(1),
(2) Date: Oct. 15, 2021

(87) PCT Pub. No.: WO2020/218474
PCT Pub. Date: Oct. 29, 2020

(65) Prior Publication Data
US 2022/0216460 A1 Jul. 7, 2022

(30) Foreign Application Priority Data
Apr. 26, 2019 (JP) .................................. 2019-086073

(51) Int. Cl.
*H01M 4/36* (2006.01)
*C01G 53/00* (2006.01)
(Continued)

(52) U.S. Cl.
CPC ............ *H01M 4/364* (2013.01); *C01G 53/42* (2013.01); *C01G 53/50* (2013.01); *H01M 4/505* (2013.01);
(Continued)

(58) Field of Classification Search
None
See application file for complete search history.

(56) References Cited

U.S. PATENT DOCUMENTS 11,664,526 B2 * 5/2023 Wolverton ............ H01M 10/44
429/231.95
11,967,706 B2 * 4/2024 Wang ................. C01G 49/0072
(Continued)

FOREIGN PATENT DOCUMENTS

EP 2905831 A1 8/2015
JP 2007-242420 A 9/2007
(Continued)

OTHER PUBLICATIONS

The Extended European Search Report dated Jun. 2, 2022, issued in counterpart EP Application No. 20795344.9. (8 pages).
(Continued)

*Primary Examiner* — Kevin M Bernatz
(74) *Attorney, Agent, or Firm* — WHDA, LLP

(57) ABSTRACT

A positive electrode active material for a secondary battery according to an embodiment contains: a first composite oxide component represented by general formula $Li_\alpha[Li_xM-n_yCo_zMe_{(1-x-y-z)}]O_2$ (in the formula, Me is at least one selected from among Ni Fe, Ti, Bi, Nb, W, Mo, and Ta, $0.5<\alpha<0.85$, $0.05<x<0.2$, $0.4<y<0.75$, and $0<z<0.25$), and having at least one crystal structure selected from among O2, T2, and O6 structures; and a second composite oxide component represented by general formula $Li_aMO_bA_c$ (in the formula, M is at least one selected from among Ni, Co,
(Continued)

Mn, Fe, Cu, Ti, Nb, Al, Ga, Bi, Zr, Ce, Y, W, Ta, Sn, Ca, Ba, and Na, A is at least one selected from among F, Cl, and S, $1.3<a<7$, $2≤b<5$, and $0≤c≤0.3$).

8 Claims, 1 Drawing Sheet

(51) Int. Cl.
    *H01M 4/02*           (2006.01)
    *H01M 4/505*         (2010.01)
    *H01M 4/525*         (2010.01)
    *H01M 4/58*           (2010.01)

(52) U.S. Cl.
    CPC ......... *H01M 4/525* (2013.01); *H01M 4/5825* (2013.01); *C01P 2006/40* (2013.01); *H01M 2004/028* (2013.01)

(56) References Cited

U.S. PATENT DOCUMENTS

| | | |
|---|---|---|
| 2015/0093646 A1 | 4/2015 | Kawada |
| 2015/0243980 A1 | 8/2015 | Kawada |
| 2016/0028081 A1* | 1/2016 | Zhang .................. H01M 4/366 429/231.1 |
| 2016/0056460 A1* | 2/2016 | Kawada ............. C01G 49/0018 429/223 |
| 2018/0309159 A1 | 10/2018 | Hori |
| 2021/0143397 A1* | 5/2021 | Uchida ................. H01M 4/525 |
| 2021/0288320 A1* | 9/2021 | Kawada ............. H01M 4/525 |
| 2022/0020977 A1* | 1/2022 | Maxwell ............ H01M 10/052 |
| 2022/0393156 A1* | 12/2022 | Lim ...................... H01M 10/42 |

FOREIGN PATENT DOCUMENTS

| | | |
|---|---|---|
| JP | 2014-130782 A | 7/2014 |
| JP | 2014-197540 A | 10/2014 |
| JP | 2015-92455 A | 5/2015 |
| JP | 2015-138730 A | 7/2015 |
| JP | 2018-185905 A | 11/2018 |
| WO | WO-2018187531 A1 * | 10/2018 ............. C01G 53/42 |

OTHER PUBLICATIONS

Lee Hochun et al: "Li 2 NiO 2 as a Novel Cathode Additive for Overdischarge Protection of Li-Ion Batteries", Chemistry of Materials, vol. 20, No. 1, Jan. 1, 2008 (Jan. 1, 2008), pp. 5-7, XP055819131; Cited in Extended European Search Report dated Jun. 2, 2022. (3 pages).

International Search Report dated Aug. 4, 2020, issued in counterpart International Application No. PCT/JP2020/017613 (2 pages).

* cited by examiner

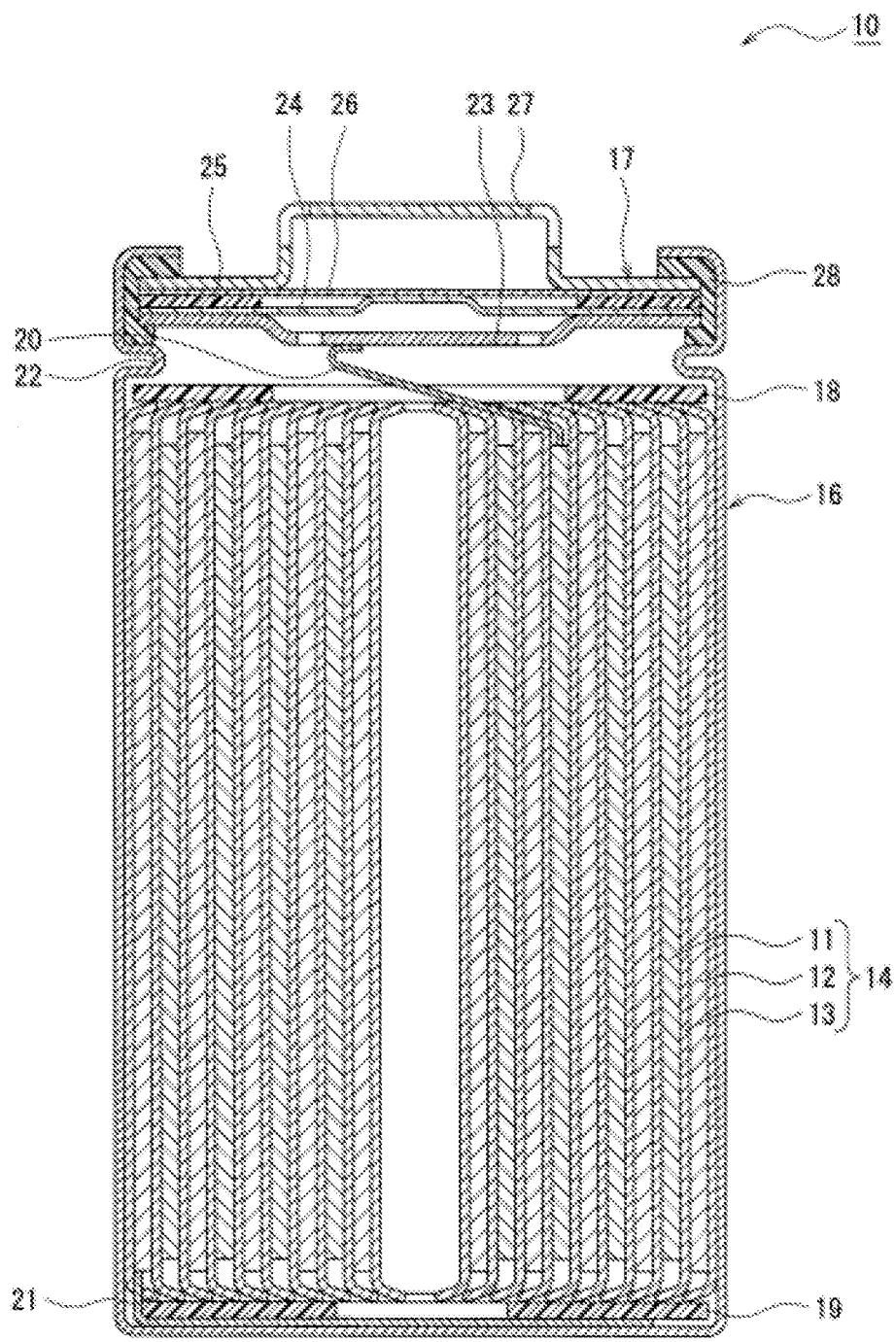

POSITIVE ELECTRODE ACTIVE MATERIAL FOR SECONDARY BATTERY, AND SECONDARY BATTERY

TECHNICAL FIELD

The present disclosure relates to a positive electrode active material for secondary battery, and a secondary battery using the positive electrode active material.

BACKGROUND

Conventionally, a lithium transition metal composite oxide is widely used as a positive electrode active material for a secondary battery such as a lithium ion battery. For example, Patent Literature 1 discloses a lithium transition metal composite oxide having a crystal structure defined by O2 structure and containing Li in the transition metal layer. Such a composite oxide is promising as a high-capacity material because its discharge capacity becomes increased by being activated under a high voltage.

CITATION LIST

Patent Literature

PATENT LITERATURE 1: Japanese Unexamined Patent Application Publication No. 2015-92455

SUMMARY

However, in a conventional lithium transition metal composite oxide as disclosed in Patent Literature 1, the crystal structure may collapse when a charging process is repeated at a high voltage, so that there is room for improvement especially in cycle characteristics.

A positive electrode active material for secondary battery according to one aspect of the present disclosure contains: a first composite oxide component represented by general formula $Li_\alpha[Li_xMn_yCo_zMe_{(1-x-y-z)}]O_2$ (where Me is at least one selected from Ni, Fe, Ti, Bi, Nb, W, Mo, and Ta, and $0.5<\alpha<0.85$, $0.05<x<0.2$, $0.4<y<0.75$, and $0<z<0.25$ hold true) and having at least one crystal structure selected from O2 structure, T2 structure, and O6 structure; and a second composite oxide component represented by general formula $Li_aMO_bA_c$ (where M is at least one selected from Ni, Co, Mn, Fe, Cu, Ti, Nb, Al, Ga, Bi, Zr, Ce, Y, W, Ta, Sn, Ca, Ba, and Na; A is at least one selected from F, Cl, and S; and $1.3<a<7$, $2\leq b<5$, and $0\leq c\leq 0.3$ hold true).

A secondary battery according to one aspect of the present disclosure includes a positive electrode containing the above-described positive electrode active material, a negative electrode, and an electrolyte.

By means of the positive electrode active material according to one aspect of the present disclosure, it is possible to provide a secondary battery having a high capacity and excellent cycle characteristics.

BRIEF DESCRIPTION OF DRAWINGS

FIG. 1 is a cross-sectional view of a secondary battery according to an example embodiment.

DESCRIPTION OF EMBODIMENTS

As a result of conducting diligent studies to solve the above-mentioned problems, the present inventors discovered that a positive electrode active material containing the above-described first composite oxide component and the above-described second composite oxide component has a high capacity and excellent structural stability. By using the positive electrode active material according to the present disclosure, it is possible to achieve an increase in battery capacity and an improvement in cycle characteristics. In addition, a decrease in open circuit voltage (OCV) after charge/discharge cycles can be suppressed.

The positive electrode active material for secondary battery according to the present disclosure and an example embodiment of a secondary battery using the positive electrode active material will now be described in detail. Although a cylindrical battery in which a spiral-type electrode assembly 14 is housed in a bottomed cylindrical outer can 16 is described below as an example, the outer housing is not limited to a cylindrical outer can, and may for example be a rectangular outer can, or may be an outer housing made of a laminate sheet including a metal layer and a resin layer. Further, the electrode assembly may be a laminate-type electrode assembly in which a plurality of positive electrodes and a plurality of negative electrodes are alternately laminated via separators.

FIG. 1 is a cross-sectional view of a secondary battery 10 according to an example embodiment. As shown for example in FIG. 1, the secondary battery 10 comprises a spiral-type electrode assembly 14, an electrolyte, and an outer can 16 that houses the electrode assembly 14 and the electrolyte. The electrode assembly 14 includes a positive electrode 11, a negative electrode 12, and separators 13, and has a winding structure in which the positive electrode 11 and the negative electrode 12 are wound in a spiral shape with the separators 13 located between the electrodes 11, 12. The outer can 16 is a bottomed cylindrical metal container having an opening on one side in the axial direction, and the opening of the outer can 16 is closed off by a sealing assembly 17. In the following, for convenience of explanation, the sealing assembly 17 side of the battery is described as the top, and the bottom portion side of the outer can 16 is described as the bottom.

The electrolyte may be an aqueous electrolyte, but preferably is a non-aqueous electrolyte containing a non-aqueous solvent and an electrolyte salt dissolved in the non-aqueous solvent. As the non-aqueous solvent, for example, an ester, an ether, a nitrile, an amide, a mixed solvent containing two or more of the foregoing, or the like is used. The non-aqueous solvent may contain a halogen-substituted product, such as methyl fluoropropionate (FMP) or fluoroethyl acetate (FEA), obtained by substituting at least a part of the hydrogens in the above solvents with halogen atoms such as fluorine. As the electrolyte salt, for example, a lithium salt such as $LiPF_6$ or a lithium imide salt such as LiFSI is used. The electrolyte is not limited to a liquid electrolyte, and may be a solid electrolyte using a gel polymer or the like.

The positive electrode 11, the negative electrode 12, and the separators 13, which constitute the electrode assembly 14, are all long strip-shaped members, and are alternately laminated in the radial direction of the electrode assembly 14 by being wound in a spiral shape. The negative electrode 12 is formed to have a size somewhat larger than that of the positive electrode 11 in order to prevent precipitation of lithium. That is, the negative electrode 12 is formed longer than the positive electrode 11 in the length direction and in the width direction (or the short-side direction). The two separators 13 are formed somewhat larger than at least the positive electrode 11, and are arranged so as to, for example, sandwich the positive electrode 11. Further, the electrode assembly 14 includes a positive electrode lead 20 connected to the positive electrode 11 by welding or the like, and a negative electrode lead 21 connected to the negative electrode 12 by welding or the like.

Insulation plates 18 and 19 are respectively arranged above and below the electrode assembly 14. In the example shown in FIG. 1, the positive electrode lead 20 extends through a through hole in the insulation plate 18 and toward the sealing assembly 17, while the negative electrode lead 21 extends outside the insulation plate 19 and toward the bottom portion of the outer can 16. The positive electrode lead 20 is connected to the lower surface of an internal terminal plate 23 of the sealing assembly 17 by welding or the like, and a cap 27, which is the top plate of the sealing assembly 17 electrically connected to the internal terminal plate 23, serves as the positive electrode terminal. The negative electrode lead 21 is connected to the inner surface of the bottom portion of the outer can 16 by welding or the like, and the outer can 16 serves as the negative electrode terminal.

A gasket 28 is provided between the outer can 16 and the sealing assembly 17 so as to ensure airtightness inside the battery. The outer can 16 has formed thereon a grooved portion 22, in which a part of a side surface portion protrudes inward and supports the sealing assembly 17. The grooved portion 22 is preferably formed in an annular shape along the circumferential direction of the outer can 16, and supports the sealing assembly 17 on its upper surface. The sealing assembly 17 is fixed to an upper part of the outer can 16 by means of the grooved portion 22 and an opening end portion of the outer can 16 which is crimped to the sealing assembly 17.

The sealing assembly 17 has a structure obtained by laminating, in order from the electrode assembly 14 side, the internal terminal plate 23, a lower valve member 24, an insulation member 25, an upper valve member 26, and the cap 27. Each of the members constituting the sealing assembly 17 has, for example, a disk shape or a ring shape, and the respective members except the insulation member 25 are mutually electrically connected. The lower valve member 24 and the upper valve member 26 are connected to each other at their central portions, and the insulation member 25 is interposed between peripheral edge portions of these valve members. When the internal pressure of the battery increases due to abnormal heat generation, the lower valve member 24 deforms and ruptures in a manner pushing up the upper valve member 26 toward the cap 27, and the current path between the lower valve member 24 and the upper valve member 26 is thereby cut off. When the internal pressure increases further, the upper valve member 26 ruptures, and gas is discharged from an opening in the cap 27.

A detailed description will now be given regarding the positive electrode 11, the negative electrode 12, and the separators 13, which constitute the electrode assembly 14, and in particular regarding a positive electrode active material constituting the positive electrode 11.

[Positive Electrode]

The positive electrode 11 comprises a positive electrode core, and a positive electrode mixture layer provided on a surface of the positive electrode core. For the positive electrode core, it is possible to use: a foil of a metal that is stable in the potential range of the positive electrode 11, such as aluminum; a film having such a metal disposed on its surface layer; and the like. The positive electrode mixture layer contains a positive electrode active material, a binder, and a conductive material, and is preferably provided on both sides of the positive electrode core excluding the portion to which the positive electrode lead 20 is connected. The positive electrode active material is a lithium transition metal composite oxide, and contains two types of composite oxide components. The positive electrode 11 can be produced by, for example, applying a positive electrode mixture slurry containing the positive electrode active material, the binder, the conductive material, and the like onto the surfaces of the positive electrode core, drying the applied films, and then compressing the films to thereby form positive electrode mixture layers on both sides of the positive electrode core.

Examples of the conductive material contained in the positive electrode mixture layer include carbon materials such as carbon black, acetylene black, Ketjen black, and graphite. Examples of the binder contained in the positive electrode mixture layer include fluororesins such as polytetrafluoroethylene (PTFE) and polyvinylidene fluoride (PVdF), polyacrylonitrile (PAN), polyimides, acrylic resins, polyolefins, and so on. These resins may be used in combination with cellulose derivatives such as carboxymethyl cellulose (CMC) or salts thereof, polyethylene oxide (PEO), and the like.

The positive electrode active material contains a first composite oxide component represented by general formula $Li_\alpha[Li_xMn_yCo_zMe_{(1-x-y-z)}]O_2$ (where Me is at least one selected from Ni, Fe, Ti, Bi, Nb, W, Mo, and Ta, and $0.5<\alpha<0.85$, $0.05<x<0.2$, $0.4<y<0.75$, and $0<z<0.25$ hold true) and a second composite oxide component represented by general formula $Li_aMO_bA_c$ (where M is at least one selected from Ni, Co, Mn, Fe, Cu, Ti, Nb, Al, Ga, Bi, Zr, Ce, Y, W, Ta, Sn, Ca, Ba, and Na; A is at least one selected from F, Cl, and S; and $1.3<a<7$, $2\leq b<5$, and $0\leq c\leq0.3$ hold true). The positive electrode active material may contain a third composite oxide component so long as the object of the present disclosure is not undermined.

The content of the second composite oxide component is preferably from 1 to 25% by mass or less, and more preferably from 5 to 20% by mass, relative to the total mass of the positive electrode active material. The content of the first composite oxide component is preferably from 75 to 99% by mass, and more preferably from 80 to 95% by mass, relative to the total mass of the positive electrode active material. When the abundance ratios of the first composite oxide and the second composite oxide are within the above-noted ranges, the structure of the positive electrode active material is easily stabilized, which is preferable in terms of increasing the battery capacity and improving the cycle characteristics.

The positive electrode active material is, for example, a composite of a first composite oxide component and a second composite oxide component. The positive electrode active material is a particulate matter, and the composite contains, within a single particle, a region having a first composite oxide composition and a region having a second composite oxide composition. In this case, the positive electrode active material is composed of only one kind of particles. The first composite oxide composition region and the second composite oxide composition region may be present uniformly within a single particle, or the respective regions may be unevenly locally distributed in the center or at the surface of the particle. Further, a composition region in which the first composite oxide and the second composite oxide form a solid solution with each other may be present. In that case, it is preferable that, in a sectional view of the active material, the respective regions have a size of 100 nm square or larger.

Example methods for producing a composite as described above include: a method in which the first composite oxide and the second composite oxide are mechanically fixed to each other using a technique such as mechanical milling; a method in which the first composite oxide particles are subjected to a liquid-phase growth process or a vapor-phase growth process so that, on the surface thereof, the second composite oxide is formed and adhered; and a method in which the first composite oxide and the second composite oxide are formed into a single particle by heat treatment or pressurization.

The positive electrode active material may be a mixture of the first composite oxide particles containing the first composite oxide component and the second composite oxide particles containing the second composite oxide component. In that case, the positive electrode active material is composed of two kinds of particles. Further, it is preferable that the first composite oxide particles have a large particle size while the second composite oxide particles have a small particle size, and the particle size ratio is more preferably from 4:1 to 2:1. The particle size of the positive electrode active material is, for example, 5 μm or less, and preferably 3 μm or less.

The mixture may be composed of two or more kinds of particles. At least one of the kinds is a particle containing only the second composite oxide. The positive electrode active material may be, for example, a mixture of a composite of the first composite oxide component and the second composite oxide component, and the second composite oxide particles. Alternatively, the positive electrode active material may be a mixture of the composite, the first composite oxide particles, and the second composite oxide particles. When, for example, the positive electrode active material is a mixture of the composite and the second composite oxide particles, the mass ratio of the composite to the second composite oxide particles is preferably from 75:25 to 99:1.

The first composite oxide component has at least one crystal structure selected from O2 structure, T2 structure, and O6 structure. Preferably, the main crystal structure is the O2 structure. For example, at least 50 atom % of the crystal structure of the first composite oxide component, or substantially the entirety thereof, has the O2 structure. Here, the O2 structure is a layered crystal structure in which lithium is present in the center of an oxygen octahedron, in which two manners of overlap between oxygen and transition metals exist per unit cell, and which belongs to the space group $P6_3mc$. Such a layered crystal structure has a lithium layer, a transition metal layer, and an oxygen layer. Referring to the above-noted general formula of the first composite oxide component, the lithium layer contains $Li_\alpha$, the transition metal layer contains $Li_xMn_yCo_zMe_{(1-x-y-z)}$, and the oxygen layer contains $O_2$.

When synthesizing the first composite oxide component having the O2 structure, composite oxides having the T2 structure and the O6 structure may be synthesized at the same time as by-products. As noted above, the first composite oxide component may contain composite oxides having the T2 structure and the O6 structure which are synthesized as by-products. Here, the T2 structure is a layered crystal structure in which lithium is present in the center of an oxygen tetrahedron, in which two manners of overlap between oxygen and transition metals exist per unit cell, and which belongs to the space group Cmca. The O6 structure is a layered crystal structure in which lithium is present in the center of an oxygen octahedron, in which six manners of overlap between oxygen and transition metals exist per unit cell, and which belongs to the space group R-3m.

In the first composite oxide component, Li contained in the transition metal layer is present by more than 5 mol % and less than 25 mol %, and preferably more than 10 mol % and less than 20 mol %, relative to the total molar amount of the metal elements contained in the transition metal layer. When the Li content is 25 mol % or more, high capacity cannot be maintained. Further, the Mn content is more than 40 mol % and less than 75 mol %, and preferably more than 50 mol % and less than 65 mol %, relative to the total molar amount of the metal elements contained in the transition metal layer. The Co content is more than 0 mol % and less than 25 mol %, and preferably more than 5 mol % and less than 20 mol %, relative to the total molar amount of the metal elements contained in the transition metal layer.

The metal element Me other than Li, Mn, and Co contained in the first composite oxide component is preferably at least one selected from Ni, Fe, Ti, Bi, Nb, W, Mo, and Ta. Among these, Ni and Fe are preferable. The Me content is preferably more than 10 mol % and less than 25 mol % relative to the total molar amount of the metal elements contained in the transition metal layer. The first composite oxide component may contain metal elements other than the above so long as the object of the present disclosure is not undermined.

The first composite oxide particles containing the first composite oxide component can be synthesized by subjecting a sodium transition metal composite oxide containing at least Mn and Co to ion exchange so as to replace Na with Li. An example method of the ion exchange is a method in which, to a sodium transition metal composite oxide, a molten salt bed of lithium salt is added and heated. As the lithium salt, it is preferable to use at least one selected from lithium nitrate, lithium sulfate, lithium chloride, lithium carbonate, lithium hydroxide, lithium iodide, lithium bromide, and the like. Further, the ion exchange may be performed by immersing the sodium transition metal composite oxide in a solution containing at least one lithium salt. The ion exchange may not proceed completely, and a certain amount of Na may remain.

As noted above, the second composite oxide component is represented by general formula $Li_aMO_bA_c$ (where M is at least one selected from Ni, Co, Mn, Fe, Cu, Ti, Nb, Al, Ga, Bi, Zr, Ce, Y, W, Ta, Sn, Ca, Ba, and Na; A is at least one selected from F, Cl, and S; and $1.3<a<7$, $2\leq b<5$, and $0\leq c\leq 0.3$ hold true). An example of a suitable second composite oxide component is a composite oxide represented by general formula $Li_2Ni_dB_{1-d}O_{2-c}A_c$ (where B is at least one selected from Ga, Bi, Y, W, Ta, Sn, Ca, and Ba, and $0.7\leq d\leq 1$ holds true) and having a crystal structure belonging to the space group Immm, or a composite oxide represented by general formula $Li_2O \cdot \beta Co_eMa_{1-E}O_{1-c} \cdot \gamma LiFe_fMa_{1-f}O_2$, (where Ma is at least one selected from Mn, Al, Ga, Ge, Zn, Zr, Ce, Y, Sn, Si, Ti, and Na, and $0\leq\beta\leq 0.4$, $0\leq\gamma<0.6$, $0<\beta+\gamma$, $0.7\leq e\leq 1$ and $0.7\leq f\leq 1$ hold true) and having a crystal structure belonging to the space group Pbca.

Specific examples of the second composite oxide component include composite oxides represented by general formulas $L_2NiO_2$, $Li_2Ni_{0.94}Co_{0.03}Al_{0.03}O_2$, $Li_2Ni_{0.97}Ga_{0.03}O_2$, $Li_2MnO_3$, $Li_5FeO_4$, $Li_5Fe_{0.8}Co_{0.2}O_4$, $Li_2CuO_2$, $Li_2TiO_3$, $Li_3NbO_4$, and the like. The second composite oxide component may contain metal elements other than the above so long as the object of the present disclosure is not undermined.

The second composite oxide component preferably contains Ni or Fe as the metal element M. An example of a suitable second composite oxide component is a composite oxide represented by general formula $Li_2NiO_2$ and having a crystal structure belonging to the space group Immm. Another example of a suitable second composite oxide component is a composite oxide represented by general formula $Li_5FeO_4$ and having a crystal structure belonging to the space group Pbca. An analysis of the crystal structure of the composite oxide is performed by Rietveld analysis of an X-ray diffraction pattern measured by a powder X-ray diffractometer (for example, a desktop X-ray diffractometer Miniflex manufactured by Rigaku Corporation).

Further, the second composite oxide component preferably contains $Li_2SO_4$. Since the second composite oxide has high surface reactivity, when preparing the positive electrode mixture slurry, the second composite oxide may possibly react with the binder and cause gelation of the positive electrode mixture slurry. By containing $Li_2SO_4$, reactivity of the particle surface is reduced, so that reaction with the binder at the time of forming the mixture is suppressed, and the process is stabilized. The $Li_2SO_4$ content is preferably 0.1% by mass or more, and more preferably 0.3% by mass or more, relative to the total mass of the second composite oxide.

The second composite oxide particles containing the second composite oxide component are synthesized by, for example, mixing an oxide containing the metal element M with a lithium compound such as lithium hydroxide in a predetermined molar ratio, and firing the mixture in an oxygen-free atmosphere under a condition of from 650° C. to 850° C. Alternatively, a composite in which the first composite oxide component and the second composite oxide component are combined can be synthesized by heat-treating the first composite oxide particles, which are synthesized by the above-described ion exchange, together with a lithium salt such as lithium iodide in a molten salt bed of lithium salt.

The positive electrode active material may contain an amorphous lithium transition metal composite oxide. As a result of initial charging, lithium ions are dissociated from the lithium transition metal composite oxide, and a part of the crystal structure collapses and becomes amorphous. An amorphous composite oxide has low reactivity, and, at its surface, electrolyte decomposition and gas generation are suppressed. The term "amorphous" as used herein denotes, for example, a state in which a half-width w of a diffraction line corresponding to a (101) plane of the lithium transition metal composite oxide obtained by X-ray diffractometry satisfies $w > 0.5°$.

[Negative Electrode]

The negative electrode 12 comprises a negative electrode core and a negative electrode mixture layer provided on a surface of the negative electrode core. For the negative electrode core, it is possible to use: a foil of a metal that is stable in the potential range of the negative electrode 12, such as copper; a film having such a metal disposed on its surface layer; and the like. The negative electrode mixture layer contains a negative electrode active material and a binder, and is preferably provided, for example, on both sides of the negative electrode core excluding the portion to which the negative electrode lead 21 is connected. The negative electrode 12 can be produced by, for example, applying a negative electrode mixture slurry containing the negative electrode active material, the binder, and the like onto the surfaces of the negative electrode core, drying the applied films, and then compressing the films to thereby form negative electrode mixture layers on both sides of the negative electrode core.

As the negative electrode active material, the negative electrode mixture layer contains, for example, a carbon-based active material that reversibly occludes and releases lithium ions. Preferred carbon-based active materials are graphite including natural graphite such as scaly graphite, massive graphite, and earthy graphite, and artificial graphite such as massive artificial graphite (MAG) and graphitized mesophase carbon microbeads (MCMB). Further, as the negative electrode active material, a Si-based active material composed of at least one of Si and a Si-containing compound may be used. A carbon-based active material and a Si-based active material may be used in combination.

As the binder contained in the negative electrode mixture layer, fluororesins, PAN, polyimides, acrylic resins, polyolefins, and the like can be used as with the positive electrode 11, but styrene-butadiene rubber (SBR) is preferably used. Further, the negative electrode mixture layer preferably additionally contains CMC or a salt thereof, polyacrylic acid (PAA) or a salt thereof, polyvinyl alcohol (PVA), or the like. Among the foregoing, use of SBR in combination with CMC or a salt thereof or PAA or a salt thereof is preferred.

[Separator]

As the separator 13, a porous sheet having ion permeability and insulating property is used. Specific examples of the porous sheet include a microporous thin film, a woven fabric, and a non-woven fabric. As the material of the separator 13, olefin resins such as polyethylene and polypropylene, cellulose, and the like are preferred. The separator 13 may have either a single-layer structure or a laminated structure. A heat-resistant layer or the like may be formed on the surface of the separator.

EXAMPLES

While the present disclosure will now be described further using Examples, the present disclosure is not limited to these Examples.

Example 1

[Synthesis of Composite (First Composite Oxide Component A+Second Composite Oxide Component B)]

Sodium carbonate ($Na_2CO_3$), lithium hydroxide monohydrate ($LiOH \cdot H_2O$), nickel oxide (NiO), cobalt oxide ($Ca_2O_3$), and manganese oxide ($M_2O_3$) were mixed at a predetermined molar ratio and pulverized by a ball mill. The pulverized product was fired in atmospheric air at 900° C. to obtain a sodium oxide. This sodium oxide was heated in a molten salt bed of lithium salt so that Na was ion-exchanged with Li. Subsequently, lithium iodide (LiI) was added to the molten salt bed and caused to react, and a composite was thereby obtained. Here, the molten salt bed can be obtained by mixing lithium nitrate and lithium chloride at a predetermined molar ratio and heating the mixture to 280° C.

The obtained composite had a particle size of 3 μm. Further, as a result of analysis by EPMA, XPS, and ICP, it was confirmed that the first composite oxide component A was formed in the center of the composite particles, and that the second composite oxide component B having a thickness of 250 nm was formed at the particle surface. The compositions of the first composite oxide component A and the second composite oxide component B in the composite were $Li_{0.83}(Li_{0.39}Mn_{0.633}Ni_{0.118}Co_{0.1})O_2$ and $Li_{1.32}$ $(Mn_{0.553}Ni_{0.158}Co_{0.289})O_{2.41}$, respectively. The content ratio of the composite oxides A and B in the composite was A:B=94:6 by molar ratio.

[Preparation of Positive Electrode]

The above-noted composite (first composite oxide component A+second composite oxide component B) was used as the positive electrode active material. A positive electrode mixture slurry was prepared by mixing the positive electrode active material, acetylene black, and polyvinylidene fluoride (PVdF) at a mass ratio of 92:5:3, and by using N-methyl-2-pyrrolidone (NMP) as a dispersion medium. Next, this positive electrode mixture slurry was applied to a surface of a positive electrode core made of aluminum foil. The applied film was dried and compressed, and then cut into a predetermined electrode size. A positive electrode having a positive electrode mixture layer formed on the positive electrode core was thereby prepared.

[Preparation of Non-Aqueous Electrolyte Solution]

Into a mixed solvent prepared by mixing fluoroethylene carbonate (FEC) and methyl fluoropropionate (FMP) at a mass ratio of 1:3, $LiPF_6$ was dissolved at a concentration of 1 mol/L, and a non-aqueous electrolyte solution was thereby prepared.

[Preparation of Secondary Battery]

An electrode assembly was prepared by attaching lead wires respectively to the above-described positive electrode and a counter electrode made of Li metal, and by arranging the positive electrode and the counter electrode facing each other via a polyolefin separator. This electrode assembly and the above-described non-aqueous electrolyte solution were sealed in an outer housing made of an aluminum laminate film, and a test cell was thereby produced.

Example 2

Lithium oxide ($Li_2O$) and nickel (II) oxide (NiO) were mixed at a predetermined molar ratio and pulverized by a ball mill in Ar atmosphere. The pulverized product was fired in Ar atmosphere at 650° C., and second composite oxide particles B ($Li_2NiO_2$) were thereby synthesized. The particle size of the synthesized second composite oxide particles B was 1 µm. A positive electrode and a test cell were prepared in the same manner as in Example 2 except that, as the positive electrode active material, the above-described second composite oxide particles B were used in addition to the composite (A+B). The composite (A+B) and the second composite oxide particles B were mixed at a mass ratio of 80:20. The particle size ratio of the composite (A+B) to the second composite oxide particles B was 3:1.

Comparative Example 1

Sodium carbonate ($Na_2CO_3$), lithium hydroxide monohydrate ($LiOH \cdot H_2O$), nickel oxide (NiO), cobalt oxide ($Ca_2O_3$), and manganese oxide ($Mu_2O_3$) were mixed at a predetermined molar ratio and pulverized by a ball mill. The pulverized product was fired in atmospheric air at 900° C. to obtain a sodium oxide. This sodium oxide was heated in a molten salt bed of lithium salt so that Na was ion-exchanged with Li, and first composite oxide particles A ($Li_{0.75}$ ($Li_{0.139}Mn_{0.625}Ni_{0.118}Co_{0.118})O_2$) were thereby obtained. The particle size of the obtained first composite oxide particles A was 3 µm. Here, the molten salt bed can be obtained by mixing lithium nitrate and lithium chloride at a predetermined molar ratio and heating the mixture to 280° C. A positive electrode and a test cell were prepared in the same manner as in Example 1 except that, as the positive electrode active material, only the above-described first composite oxide particles A were used, and second composite oxide particles B were not used.

[Evaluation of Positive Electrode Capacity and Cycle Characteristics (Capacity Retention Rate)]

Each of the test cells of the Examples and the Comparative Example was charged and discharged according to the below-described conditions in a temperature environment of 25° C., and the positive electrode capacity (i.e., the discharge capacity in the first cycle) and the capacity retention rate after charge % discharge cycles were determined.

<Charge/Discharge Conditions>

Charging was performed with a constant current of 0.05 C until the closed circuit voltage of the battery reached 4.7 V (as determined with reference to Li counter electrode), and then with a constant voltage of 4.7 V until the current value became less than 0.02 C. Subsequently, discharging was performed with a constant current of 0.05 C until the closed circuit voltage of the battery reached 2.0 V (as determined with reference to Li counter electrode). This charging/discharging process was performed for 10 cycles, and the capacity retention rate was calculated by the following formula.

Capacity retention rate (%)=Discharge capacity in the 10th cycle÷Discharge capacity in the 1st cycle×100

[Evaluation of ΔOCV]

A difference between the OCV after the first charging process and the OCV after 10 cycles in the above-described charge/discharge cycles was calculated as ΔOCV.

TABLE 1

| | Positive Electrode Active Material | Positive Electrode Capacity | Capacity Retention Rate | ΔOCV |
|---|---|---|---|---|
| Comparative Example 1 | Composite Oxide A | 259.2 | 92.3% | 0.05 |
| Example 1 | Composite (A + B) | 281.1 | 96.6% | 0.03 |
| Example 2 | Composite (A + B) + Composite Oxide B | 256.5 | 95.2% | <0 |

As shown in Table 1, both of the positive electrodes of the Examples have a higher capacity retention rate and a smaller ΔOCV value than the positive electrode of the Comparative Example. Further, both of the positive electrodes of the Examples indicate a high capacity equivalent to or exceeding that of the positive electrode of the Comparative Example. In other words, by using the positive electrode active materials of the Examples, collapse of the crystal structure resulting from the cycles is suppressed, and high capacity and good cycle characteristics can be achieved simultaneously.

REFERENCE SIGNS LIST 10 secondary battery
11 positive electrode
12 negative electrode
13 separator
14 electrode assembly
16 outer can
17 sealing assembly
18, 19 insulation plate
20 positive electrode lead
21 negative electrode lead 22 grooved portion
23 internal terminal plate
24 lower valve member
25 insulation member
26 upper valve member
27 cap
28 gasket

The invention claimed is:

1. A positive electrode active material for secondary battery, comprising:
   a first composite oxide component represented by general formula $Li_\alpha[Li_xMn_yCo_zMe_{(1-x-y-z)}]O_2$ where Me is at least one selected from Ni, Fe, Ti, Bi, Nb, W, Mo, and Ta, and $0.5<\alpha<0.85$, $0.05<x<0.2$, $0.4<y<0.75$, $0<z<0.25$, and $1-x-y-z\geq 0$ hold true, and having at least one crystal structure selected from O2 structure, T2 structure, and O6 structure; and
   a second composite oxide component represented by general formula $Li_aMO_bA_c$ where M is at least one selected from Ni, Co, Mn, Fe, Cu, Ti, Nb, Al, Ga, Bi, Zr, Ce, Y, W, Ta, Sn, Ca, Ba, and Na; A includes at least one selected from F and Cl; and $1.3<a<7$, $2>b<5$, and $0<c>0.3$ hold true,
   wherein the positive electrode active material includes a composite of the first composite oxide component and the second composite oxide component,
   the composite contains, within a single composite particle, a region having the first composite oxide component and a region having a second composite oxide composition.

2. The positive electrode active material according to claim 1, wherein a content of the second composite oxide component is from 1 to 25% by mass relative to a total mass of the positive electrode active material.

3. The positive electrode active material according to claim 1, wherein the positive electrode active material consists essentially of the composite of the first composite oxide component and the second composite oxide component.

4. The positive electrode active material according to claim 1, wherein the positive electrode active material further includes a mixture of first composite oxide particles containing the first composite oxide component and second composite oxide particles containing the second composite oxide component.

5. The positive electrode active material according to claim 1, wherein the second composite oxide component is a composite oxide represented by general formula $Li_2Ni_dB_{1-d}O_{2-c}A_c$ where B is at least one selected from Ga, Bi, Y, W, Ta, Sn, Ca, and Ba, and $0.7\leq d\leq 1$ holds true, and having a crystal structure belonging to space group Immm.

6. The positive electrode active material according to claim 1, wherein the second composite oxide component is a composite oxide represented by general formula $Li_2O\bullet\beta Co_eMa_{1-E}O_{1-c}\bullet\gamma LiFe_fMa_{1-f}O_{2-c}$ where Ma is at least one selected from Mn, Al, Ga, Ge, Zn, Zr, Ce, Y, Sn, Si, Ti, and Na, and $0\leq\beta<0.4$, $0\leq\gamma<0.6$, $0<\beta+\gamma$, $0.7\leq e\leq 1$, and $0.7\leq f\leq 1$ hold true, and having a crystal structure belonging to space group Pbca.

7. The positive electrode active material according to claim 1, wherein the second composite oxide component contains $Li_2SO_4$.

8. A secondary battery comprising a positive electrode containing the positive electrode active material according to claim 1, a negative electrode, and an electrolyte.

* * * * *